(12) United States Patent
Yamazaki et al.

(10) Patent No.: US 7,630,175 B2
(45) Date of Patent: Dec. 8, 2009

(54) FLEXIBLE, SUSPENSION, AND HEAD GIMBAL ASSEMBLY WITH PIEZOELECTRIC LAYER UNITS ADDRESSABLE BY A VOLTAGE

(75) Inventors: Hiroshi Yamazaki, Chuo-ku (JP); Masahiro Miyazaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 390 days.

(21) Appl. No.: 10/925,940

(22) Filed: Aug. 26, 2004

(65) Prior Publication Data

US 2005/0047024 A1    Mar. 3, 2005

(30) Foreign Application Priority Data

Sep. 2, 2003    (JP) ............... 2003-310403

(51) Int. Cl.
*G11B 5/596*    (2006.01)
*G11B 21/24*    (2006.01)
(52) U.S. Cl. ................... 360/294.4; 360/294.7
(58) Field of Classification Search .......... 360/294.7, 360/294.4
See application file for complete search history.

(56) References Cited

U.S. PATENT DOCUMENTS

| | | | | |
|---|---|---|---|---|
| 6,072,665 A | * | 6/2000 | Ferrari et al. | 360/245.9 |
| 6,108,175 A | * | 8/2000 | Hawwa et al. | 360/294.4 |
| 6,541,931 B2 | * | 4/2003 | Ho et al. | 318/560 |
| 6,590,748 B2 | * | 7/2003 | Murphy et al. | 360/294.4 |
| 6,680,826 B2 | * | 1/2004 | Shiraishi et al. | 360/294.4 |
| 6,728,077 B1 | * | 4/2004 | Murphy | 360/294.4 |
| 2001/0021086 A1 | | 9/2001 | Kuwajima et al. | 360/294.4 |
| 2002/0048124 A1 | | 4/2002 | Kuwajima et al. | 360/294.4 |
| 2003/0123196 A1 | * | 7/2003 | Shiraishi et al. | 360/294.4 |
| 2003/0202292 A1 | * | 10/2003 | Arya et al. | 360/294.4 |
| 2004/0136117 A1 | * | 7/2004 | Kuwajima et al. | 360/294.4 |
| 2005/0117262 A1 | * | 6/2005 | Yao et al. | 360/294.4 |
| 2006/0256479 A1 | * | 11/2006 | Yao et al. | 360/294.4 |
| 2009/0021857 A1 | * | 1/2009 | Shelor | 360/77.16 |

FOREIGN PATENT DOCUMENTS

| | | |
|---|---|---|
| JP | A-09-073746 | 3/1997 |
| JP | A-2002-134807 | 5/2002 |
| JP | A-2002-203384 | 7/2002 |

* cited by examiner

*Primary Examiner*—Julie Anne Watko
(74) *Attorney, Agent, or Firm*—Oliff & Berridge, PLC

(57) ABSTRACT

A flexure is provided with a main body on which a wire for energizing a head slider is disposed. Head slider is mounted at the front end of the flexure. Two piezoelectric layer units, each including layered piezoelectric elements, are disposed so that two of the units sandwich a line that extends from head slider to a base portion of an arm member. A voltage can be applied individually to each of the piezoelectric elements. The shape of the piezoelectric layer units are changed by adjusting the voltage applied to each of the piezoelectric elements, thereby moving head slider freely.

5 Claims, 9 Drawing Sheets

FLEXIBLE, SUSPENSION, AND HEAD GIMBAL ASSEMBLY WITH PIEZOELECTRIC LAYER UNITS ADDRESSABLE BY A VOLTAGE

RELATED APPLICATION

Japanese Patent Application No. 2003-310,403 filed on Sep. 2, 2003, from which priority is claimed, is hereby incorporated herein by reference in its entirety.

BACKGROUND OF THE INVENTION

1. Field of the Invention

The present invention relates to a flexure, a suspension, and a head gimbal assembly that may be applied to a hard disk drive, for example.

2. Description of Related Art

Head sliders having a thin-film magnetic head that records and/or reproduces magnetic information onto/from a hard disk (recording medium) constitute head gimbal assemblies by being attached to a suspension that is connected to a voice coil motor of a hard disk drive. The head sliders of the head gimbal assemblies float above hard disks in hard disk drives with a small gap therebetween, and record and/or reproduce magnetic information onto/from hard disks.

Regarding such head sliders, as the recording density of hard disks increases, it has been demanded that the float height of magnetic heads with respect to the hard disk is property controlled and that tracking adjustments for positioning the magnetic head against the target track are performed with a high precision and at a high speed. As a technique that performs the tracking adjustment, for example, the head-supporting mechanism described in Japanese Laid-Open Patent Application No. 2002-203384 is known. The head-supporting mechanism rotates the head slider by changing the shape of a thin-film piezoelectric material attached to the flexure of the thin-film magnetic head so as to perform the tracking adjustment.

SUMMARY OF THE INVENTION

However, for the mechanism described in Japanese Laid-Open Patent Application No. 2002-203384, though it is possible to perform the tracking adjustment with a high precision and at a high speed by utilizing the piezoelectric material, it is difficult to adjust the float height of magnetic heads from the hard disk.

An object of the present invention is to provide a flexure, a suspension, and a head gimbal assembly that are able to perform the tracking adjustment with a high precision and at a high speed and to adjust properly the float height of the magnetic head.

A flexure according to an aspect of the present invention is to be attached to an arm member of a suspension. The flexure includes a main body on which a head slider is to be mounted. The head slider includes a thin-film magnetic head that performs at least one of a recording and a reproduction of information with respect to a recording medium. A wire for energizing the head slider is disposed on the main body. The flexure also includes a pair of piezoelectric layer units, each including layered piezoelectric elements and being disposed on the main body so that the pair of piezoelectric layer units sandwich a line that connects the head slider and a base portion of the arm member. Each of the piezoelectric elements of the pair of piezoelectric layer units is designed so that a voltage can be applied individually to each of the piezoelectric elements.

In the flexure of this aspect of the invention, the shape of each of the piezoelectric layer units can be changed freely so as to be extended, be bent, or the like, by adjusting the voltage applied to each of the piezoelectric elements of the piezoelectric layer units. Thus, the head slider can be freely swung in three directions of pitch, roll, and yaw. Therefore, it becomes possible to perform the tracking adjustment with a high precision and at a high speed and to adjust properly the float height of the magnetic head from the hard disk.

In addition, it is preferable that the pair of piezoelectric layer units are disposed so that the pair of piezoelectric layer units are substantially symmetrical to each other with respect to the line that connects the head slider and the base portion of the arm member. With this structure, the forces applied to the head slider by the pair of piezoelectric layer units become substantially equal to each other by applying an equal voltage to each of the piezoelectric layer units, thereby smoothly swinging the head slider.

A suspension and a head gimbal assembly can be provided according to an aspect of the present invention by providing them with the flexure described above. In such an arrangement, a pair of piezoelectric layer units, each including layered piezoelectric elements, are disposed on the main body of the flexure so that the pair of piezoelectric layer units sandwich a line that connects the head slider and a base portion of the arm member. Each of the piezoelectric elements of the pair of piezoelectric layer units is designed so that a voltage can be applied individually to each of the piezoelectric elements.

With this structure, because the suspension and the head gimbal assembly according to this aspect of the invention are provided with the flexure described above, it becomes possible to swing the head slider mounted on the flexure freely in three directions of pitch, roll, and yaw. Therefore, it becomes possible to perform the tracking adjustment with a high precision and at a high speed, and to adjust properly the float height of the magnetic head from the hard disk.

Preferably, the head slider is attached to the main body at the center of gravity of a side face of the head slider, the side face facing the main body. This structure suppresses reaction forces from being applied to the suspension when the head slider is swung.

The present invention will be more fully understood from the detailed description given hereinbelow and the accompanying drawings which are given by way of illustration only, and thus are not to be considered as limiting the present invention.

DESCRIPTION OF PREFERRED EMBODIMENTS

Figure 1:
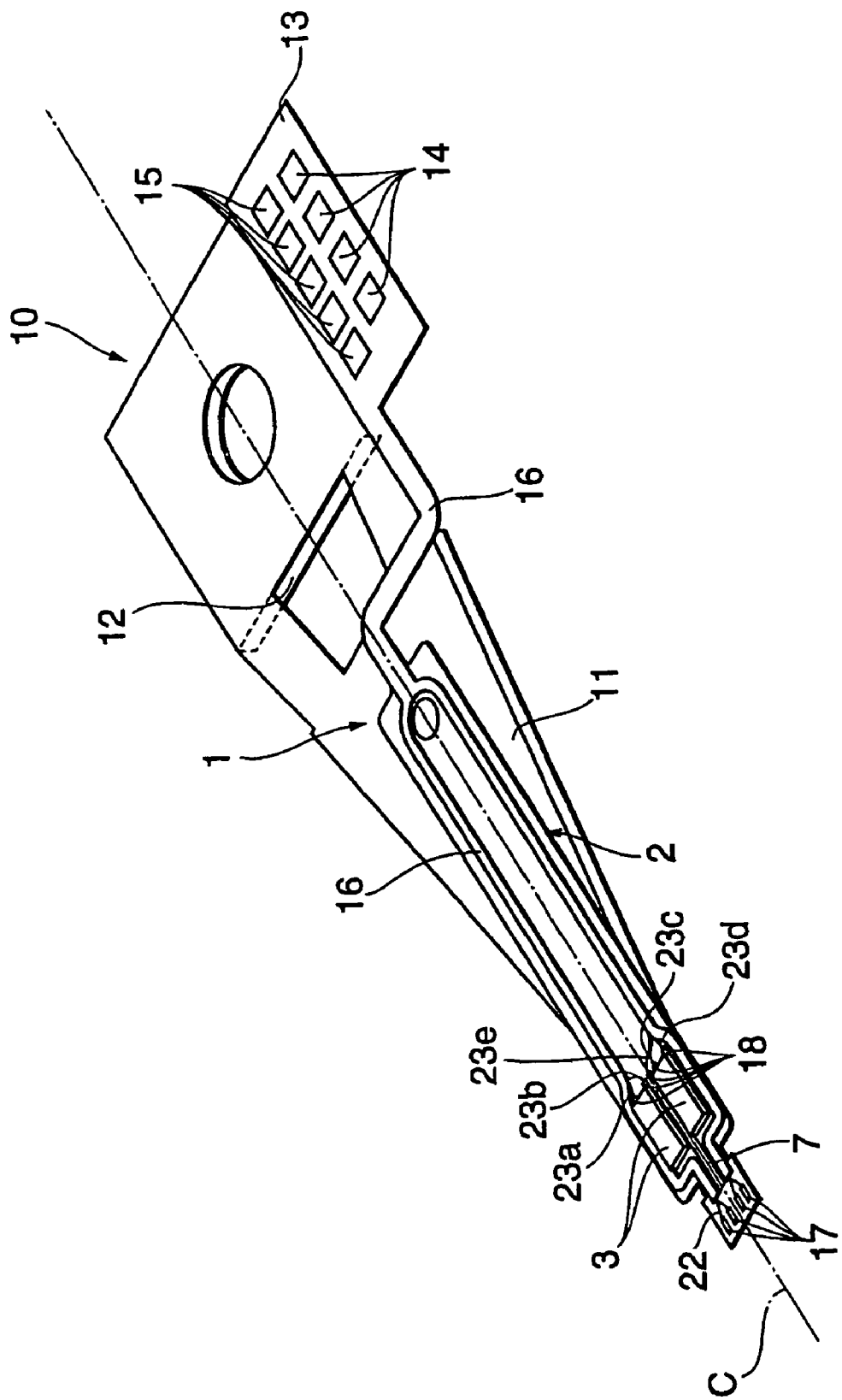
FIG. 1 is a view showing a suspension provided with a flexure in accordance with an embodiment of the present invention.

In the following, preferred, exemplary embodiments of the present invention will be explained in detail with reference to the accompanying drawings. In the figures, like reference numerals identify like elements.

First Embodiment

Figure 2:
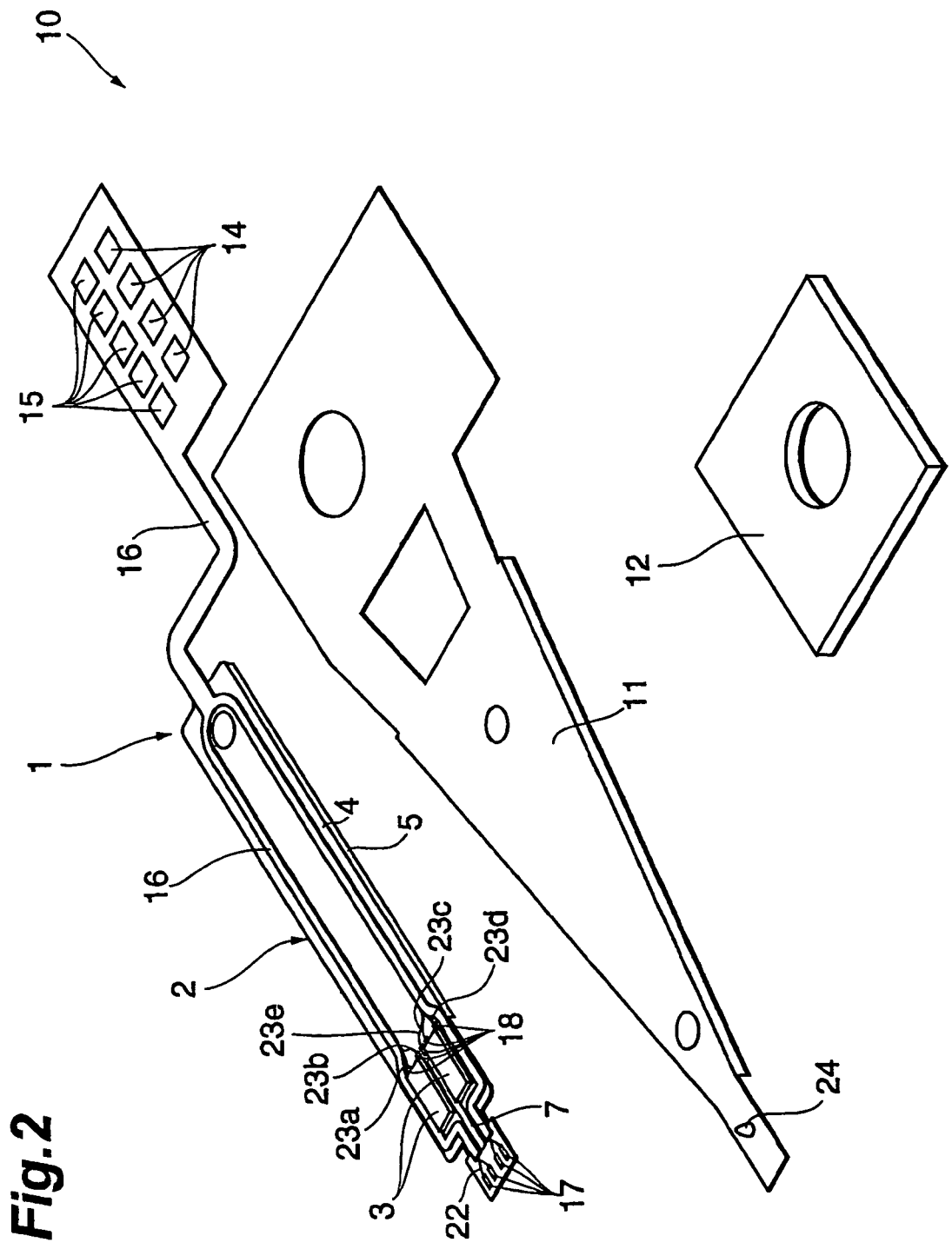
FIG. 2 is an exploded perspective view of the suspension shown in FIG. 1.
Figure 3:
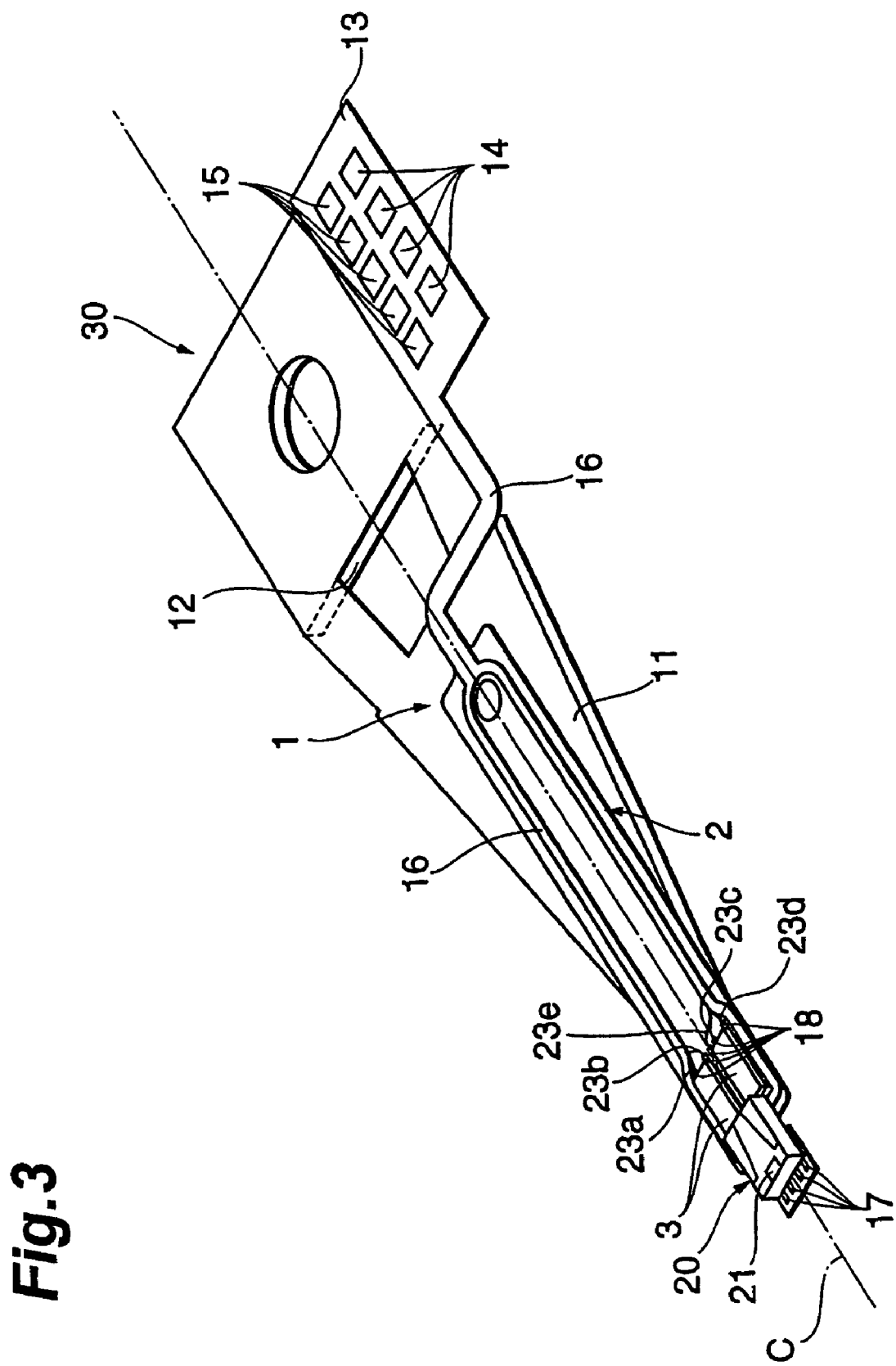
FIG. 3 is a view showing a head gimbal assembly in accordance with an embodiment of the present invention.

FIG. 1 is a view showing a suspension provided with a flexure according to an embodiment of the present invention. FIG. 2 is an exploded perspective view of the suspension shown in FIG. 1. FIG. 3 is a view showing a head gimbal assembly according to this embodiment.

As shown in FIGS. 1-3, suspension 10 for suspending head slider 20 is constituted mainly by arm member 11, base plate 12, and flexure 1. As shown in FIG. 3, head gimbal assembly 30 is constituted by mounting head slider 20 on suspension 10. Head slider 20 is provided with thin-film magnetic head 21 that performs a recording and/or reproduction with respect to a hard disk (recording medium) that is not shown in the drawing.

Arm member 11 of suspension 10 is a thin plate made of metal such as stainless steel and is an elastic body that bends in the direction perpendicular to its surface. Base plate 12 is provided on the base side of arm member 11. Furthermore, base plate 12 is attached to a rotation drive device (not depicted) in the hard disk, thereby making it possible for arm member 11 to swing on a surface parallel to the hard disk due to the movement of the rotation drive device.

Head slider 20 is mounted on the front end of flexure 1. Flexure 1 is provided with main body 2 on which wires (the details will be explained later) for energizing head slider 20 are disposed. A pair of piezoelectric layer units 3, each including two layered piezoelectric elements 6a, 6b (the details will be explained later) are provided on an upper face of the main body 2 at an area that is closer to the base end of the main body 2 than is the mount position of head slider 20. In addition, the pair of piezoelectric layer units 3 are disposed so that the pair of piezoelectric layer units are substantially symmetrical with respect to an imaginary center line C that extends from the head slider 20 to the base end of arm member 11. Slit 7 is formed along the imaginary center line C, and the pair of piezoelectric layer units 3 are substantially symmetrical to each other with respect to slit 7.

Figure 7:
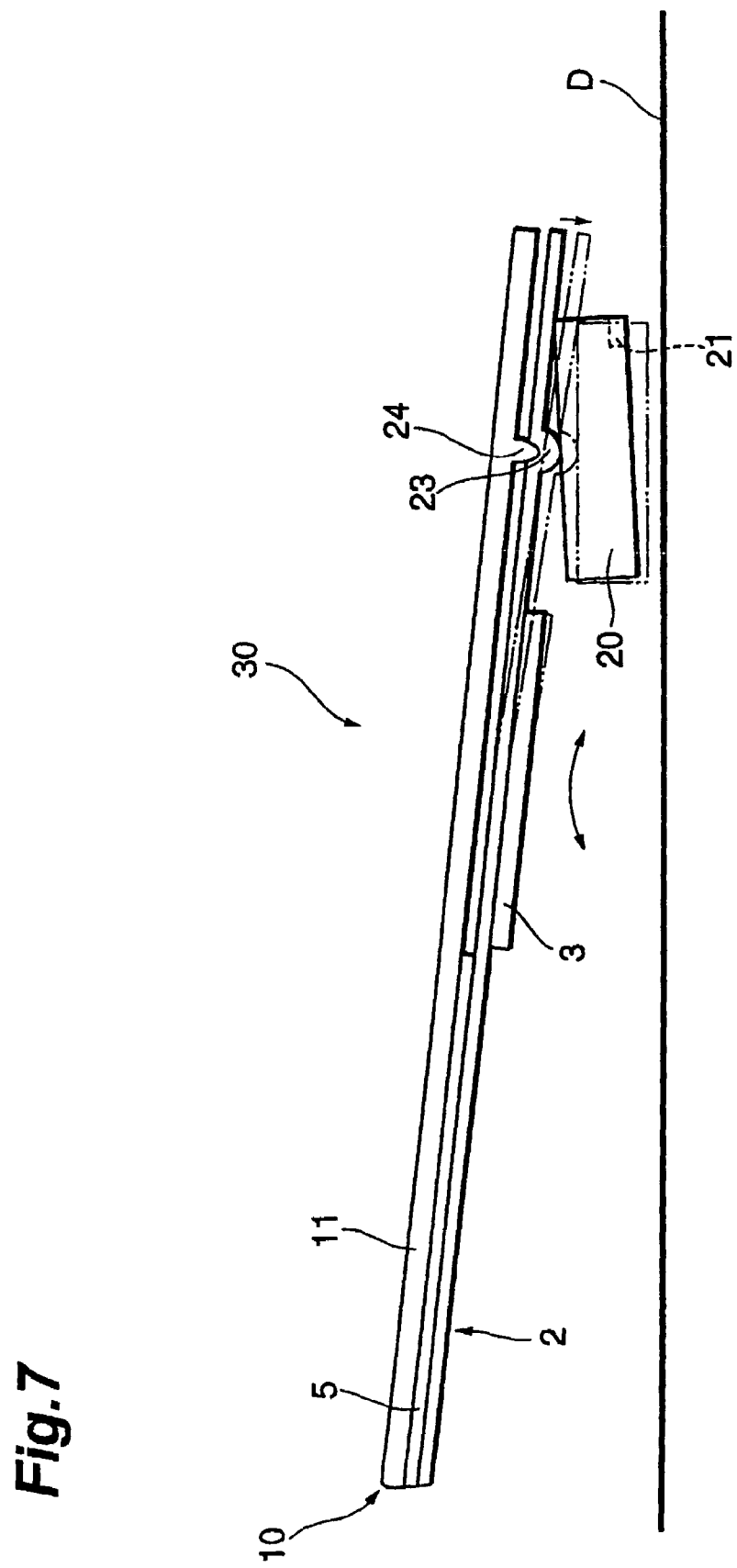
FIG. 7 is a schematic view showing the movement of the head slider due to changing the shape of piezoelectric layer units.

As shown in FIG. 2, main body 2 is constituted from insulating film 4 made of polyimide resin or the like, and flexure substrate 5 made of stainless steel or the like. Flexure substrate 5 covers the bottom face of insulating film 4 except for an area extending from the mount position of the piezoelectric layer units 3 to the front end in insulating film 4 as shown in FIGS. 2 and 7. Head wires 22 and piezoelectric wires 23a to 23e are disposed on the upper face of insulating film 4. Head wires 22 and piezoelectric wires 23a to 23e are formed of Cu, for example, and constitute printed wire 16 of which the most part is coated by an insulating layer.

One end of each of the head wires 22 is connected to a corresponding one of first head terminals 17 that are electrically connected to thin-film magnetic head 21 of head slider 20, and the other end of each of the head wires 22 is connected to a corresponding one of second head terminals 14 that are provided on terminal arrangement portion 13 of the base side of flexure 1. Such head wires 22 are for energizing the magnetoresistive device for reproducing information, and the inductive electromagnetic transducer for recording information that are formed in thin-film magnetic head 21 of head slider 20 through first and second terminals 17, 14 by external power supply (not depicted).

One end of each of the piezoelectric wires 23a to 23e is connected to a corresponding one of first piezoelectric terminals 18 that are electrically connected to piezoelectric elements 6a, 6b in piezoelectric layer units 3, and the other end of each of the piezoelectric wires 23a to 23e is connected to a corresponding one of second piezoelectric terminals 15 that are provided on terminal arrangement portion 13. Piezoelectric wires 23a, 23b are for energizing each of piezoelectric elements 6a, 6b in one of the two piezoelectric layer units 3 through first and second piezoelectric terminals 18, 15 by external power supplies (not depicted) corresponding to each of piezoelectric elements 6a, 6b individually. Similarly, piezoelectric wires 23c, 23d are for energizing each of piezoelectric elements 6a, 6b in the other of the two piezoelectric layer units 3 through first and second piezoelectric terminals 18, 15 by external power supplies (not depicted) corresponding to each of piezoelectric elements 6a, 6b individually. Piezoelectric wire 23e is for grounding one electrode in both piezoelectric elements 6a and 6b in both of the piezoelectric layer units 3 (shown in FIG. 5).

Figure 4:
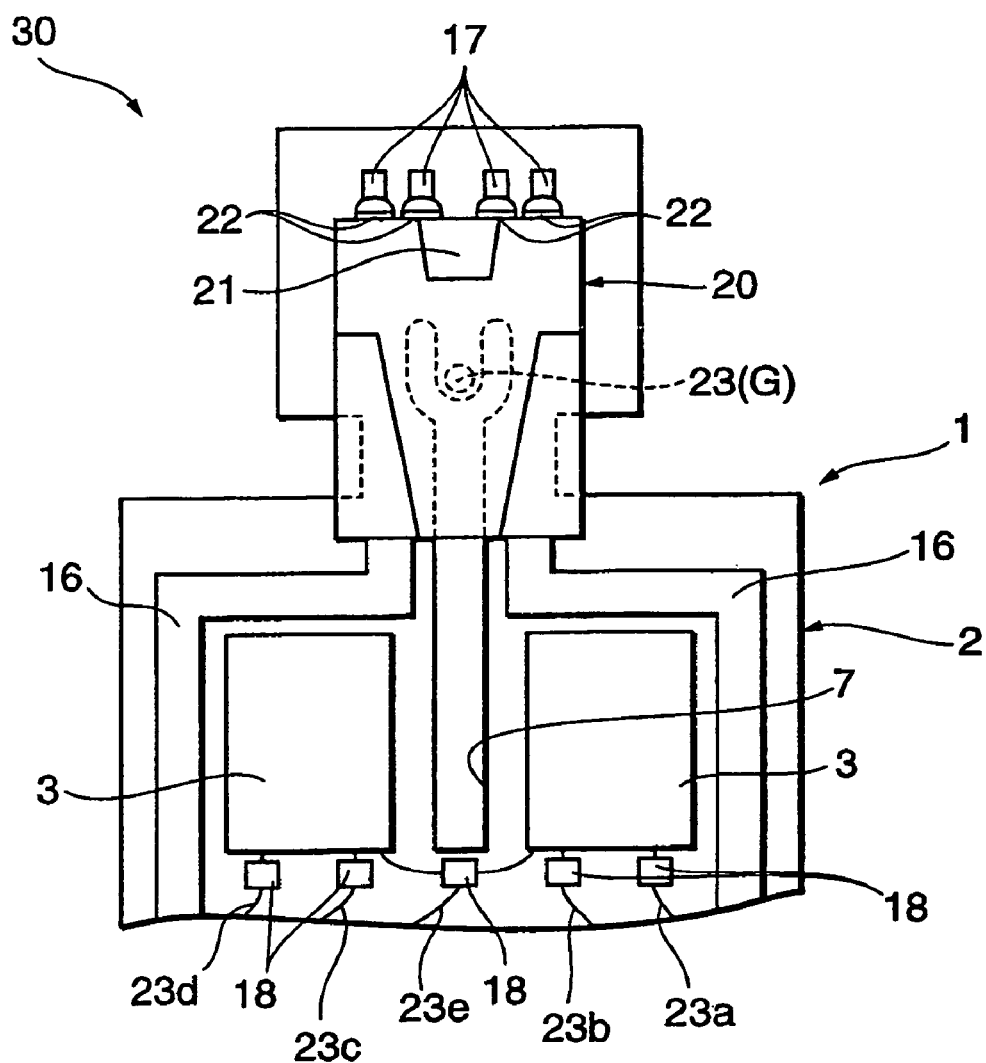
FIG. 4 is a view showing a front portion of the head gimbal assembly shown in FIG. 3.

FIG. 4 is a view showing a front portion of the head gimbal assembly 30. As shown in the drawing, head slider 20 is provided with electrode terminals 22, for the elements in thin-film magnetic head 21, on the face positioned on its front side. The electrode terminals 22 are electrically connected to first head terminals 17 by, for example, ball bonding. Head slider 20 is attached by point contact to projection 23 of flexure 1 by an adhesive or the like at a portion that includes the center of gravity G of the side face that faces main body 2 of flexure 1. Therefore, head slider 20 is fixed to main body 2 of flexure 1 at its front portion at its center of gravity G. Projection 23 is formed on main body 2 of flexure 1 and is positioned at the front side of slit 7. In addition, projection 23 is supported by projection 24 (shown in FIG. 2) formed on the front end of arm member 11.

Figure 5:
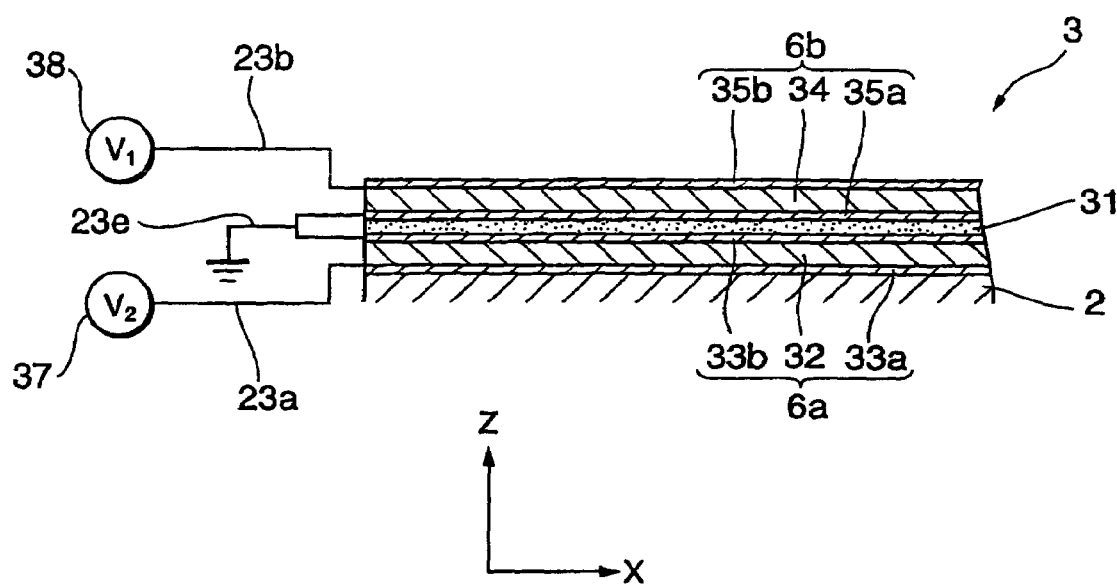
FIG. 5 is a schematic sectional view showing piezoelectric layer units in accordance with an embodiment of the present invention.

FIG. 5 is a schematic sectional view showing one of the piezoelectric layer units 3 according to the present embodiment. Piezoelectric layer units 3 are arranged to be substantially symmetrical with respect to imaginary center line C (shown in FIG. 1), and have the same structure. FIG. 5 shows the piezoelectric layer unit 3 that is connected to piezoelectric wires 23a, 23b.

Piezoelectric layer unit 3 has a structure in which piezoelectric element 6b is formed, via electrically conductive adhesive 31, on piezoelectric element 6a mounted on main body 2. In piezoelectric element 6a, thin piezoelectric film 32 and electrodes 33a, 33b provided to sandwich piezoelectric film 32 are integrally connected similarly, in piezoelectric element 6b, thin piezoelectric film 34 and electrodes 35a, 35b provided to sandwich piezoelectric film 34 are integrally connected. Furthermore, piezoelectric element 6a and piezoelectric element 6b are integrally connected by providing electrically conductive adhesive 31, described above, between electrode 33b of piezoelectric element 6a and electrode 35a of piezoelectric element 6b.

Piezoelectric films 32, 34 are formed by piezoelectric material such as, for example, Pb(Zr, Ti)O$_3$ (lead zirconate titanate; so called "PZT") or BaTiO$_3$ (barium titanate), and are manufactured by polarizing the piezoelectric material. It is not necessary to form piezoelectric film 32, 34 by only piezoelectric material. For example, when the piezoelectric material is PZT, which may be selected according to the objective of the use of the device, the oxide of Pb, Mn, Nb and so on may be added as a dopant, or a small amount of complex perovskite-like compound may be added.

Electrodes 33a, 33b, 35a, 35b are formed by Pt, for example, and are respectively connected to piezoelectric wires 23a, 23e, 23e, 23b. Piezoelectric wires 23a, 23b are respectively connected to external power supplies 37, 38, and have a positive voltage applied thereto. Therefore, a positive voltage is applied to electrode 33a and electrode 35b. In addition, because piezoelectric wires 23e are set to a ground level as described above, both of the electrodes 33b, 35a is set to ground level.

In such a piezoelectric layer unit 3, the voltage can be applied individually to the upper piezoelectric element 6a and/or to the lower piezoelectric element 6b by external power supplies 37, 38. With this structure, the shape of piezoelectric layer unit 3 can be changed freely by adjusting the voltage applied to each of the piezoelectric elements 6a, 6b. Accordingly, it is possible to expand piezoelectric layer unit 3 in the plane direction of main body 2 (i.e., in the direction of arrow X in FIG. 5) and to bend unit 3 in the vertical direction (i.e., in the direction of arrow Z in FIG. 5).

For example, when voltages applied to electrodes 33a, 35b by external power supplies 37, 38 are the same as each other, piezoelectric elements 6a, 6b contract by the same amount in their thickness direction (the direction Z in FIG. 5) and expand by the same amount in the direction X. When a voltage from external power supply 37 is higher than that from external power supply 38, piezoelectric element 6a expands more than piezoelectric element 6b in the direction X, thereby causing piezoelectric layer unit 3 to turn up so as to bend in the upper direction in FIG. 5.

Figure 6:
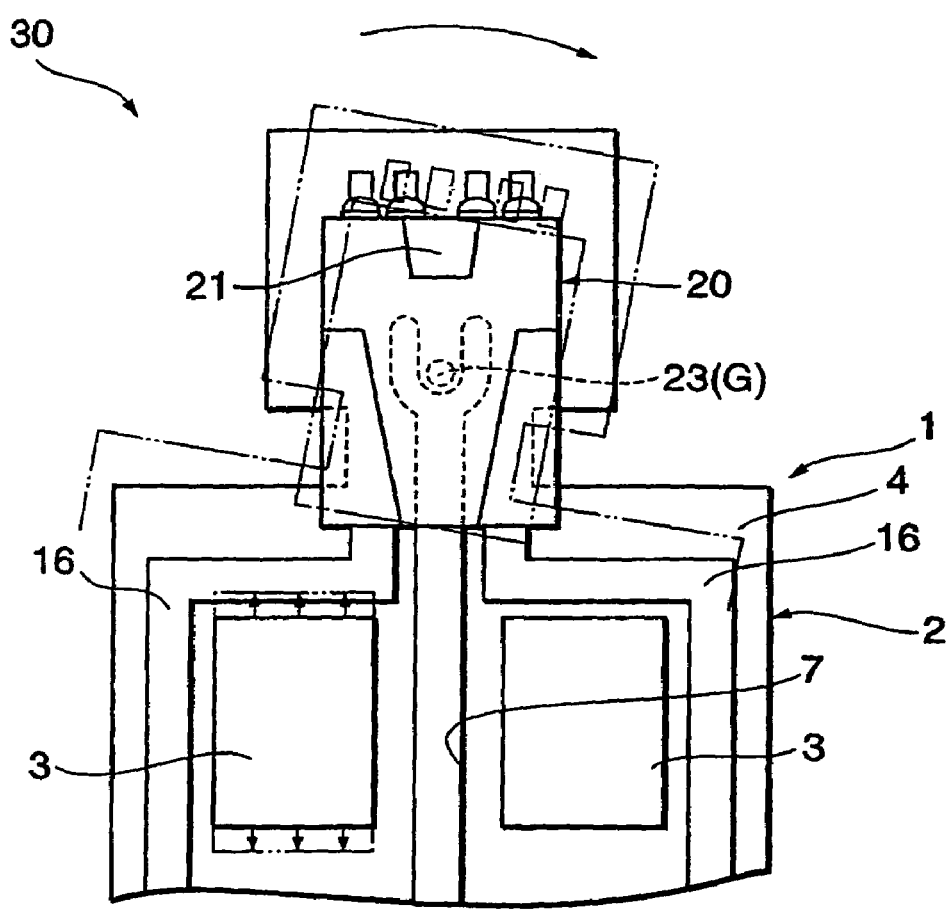
FIG. 6 is a schematic view showing the movement of the head slider due to changing the shape of piezoelectric layer units.

FIG. 6 and FIG. 7 are schematic views showing the movement of head slider 20 due to changing the shape of piezoelectric layer units 3. In FIG. 6, the left one of piezoelectric layer units 3 in the drawing expands in the plane direction of main body 2. Therefore, the left side of insulating film 4 layered on piezoelectric layer units 3 is pushed to the front side of flexure 1, thereby causing head slider 20 to rotate in the right direction in the drawing (clockwise direction) around the center of the gravity G (shown as a chain double-dashed line). On the other hand, when the right one of piezoelectric layer units 3 in the drawing expands in the plane direction of main body 2, head slider 20 rotates in the left direction (counter-clockwise direction) around the center of the gravity G.

Here, because piezoelectric layer units 3 are arranged so that the pair of piezoelectric layer units 3 are substantially symmetrical with respect to slit 7 formed on the imaginary center line C along the longitudinal direction of main body 2, the forces that are applied to head slider 20 generated by piezoelectric layer units 3 become substantially equal to each other by applying an equal voltage to each of piezoelectric layer units 3. Therefore, it becomes possible to swing smoothly head slider 20 in the clockwise and counter-clockwise directions in the drawing. In addition, because head slider 20 is attached to main body 2 at the center of gravity G, the reaction force applied to suspension 10 when head slider 20 is swung, is suppressed.

In the head gimbal assembly 30 of the present embodiment, head slider 20 can be moved minutely in the yaw direction by utilizing piezoelectric elements. Therefore it becomes possible to perform tracking adjustment with a high precision and at a high speed.

In FIG. 7, two of the piezoelectric layer units 3 are bent by the same bending amount. Thus, main body 2 connected to piezoelectric layer units 3 bends too, so that head slider 20 can be moved to be closer to hard disk D (shown as chain double-dashed line). The bending amounts of piezoelectric layer units 3 can be freely adjusted by changing the voltages applied to piezoelectric elements 6a, 6b of the piezoelectric layer units 3. Therefore, the movement amount of head slider 20 in the pitch direction can be freely adjusted by changing the bending amounts of piezoelectric layer units 3, which makes it possible to adjust properly the float height of thin-film magnetic head 21 from hard disk D.

Figure 8:
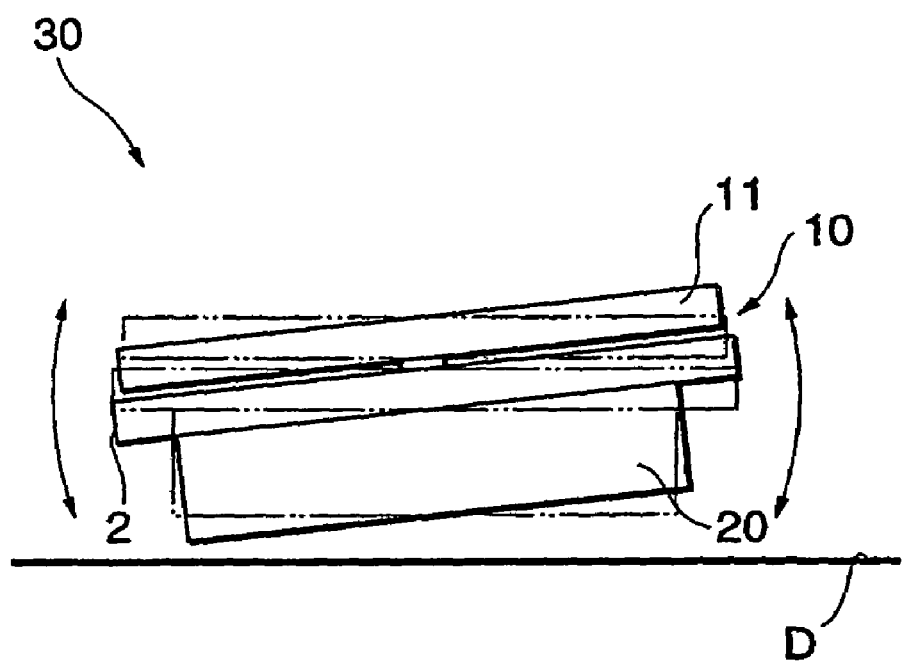
FIG. 8 is a front end view showing a head gimbal assembly in accordance with an embodiment of the present invention.

FIG. 8 is a front end view showing head gimbal assembly 30 in accordance with the present embodiment. In head gimbal assembly 30, head slider 20 can be tilted in the roll direction (in the direction of the arrows in FIG. 8) by bending only one or both of the two piezoelectric layer units 3. In FIG. 8, the tilt of main body 2 is set so that head slider 20 tilts so as to be parallel to hard disk D by adjusting the bending amount of the two piezoelectric layer units 3 (shown as a chain double-dashed line).

With this structure of head gimbal assembly 30 according to the present embodiment, the tilt in the left and right directions of head slider 20 can be adjusted. Therefore, for example, a manufactured head gimbal assembly 30 that would have been regarded, in the prior art, as an inferior product due to an unacceptably large amount of tilt in the left or right directions, can be utilized as a good-quality product. Thus, the productivity of head gimbal assemblies 30 can be increased.

In the foregoing, though the present invention was described based on one embodiment, the present invention is not limited to the above embodiment. For example, piezoelectric layer units 3 may be constituted by laminating three or more piezoelectric elements 6.

Figure 9:
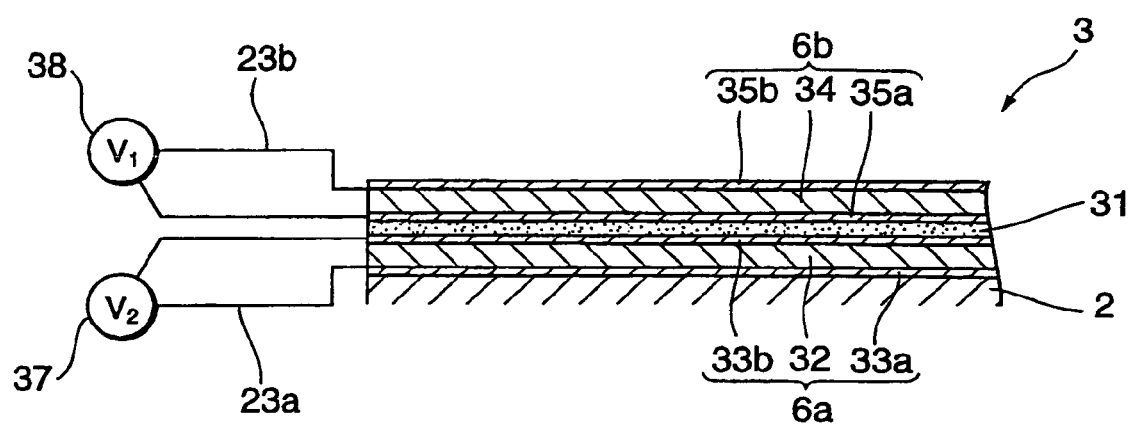
FIG. 9 is a view showing another energizing structure in the piezoelectric layer unit in accordance with another embodiment of the present invention.

In addition, although in the above embodiment, in piezoelectric elements 6a, 6b of piezoelectric layer units 3, electrodes 33a, 35b are connected to external power supplies 37, 38 and electrodes 33b, 35a are set to ground level as shown in FIG. 5, electrodes 33b, 35a may be connected to external power supplies 37, 38 respectively as shown in FIG. 9. With this structure, the adhesive disposed between piezoelectric elements 6a, 6b should be electrically non-conductive.

According to the present invention, because piezoelectric layer units are arranged on the flexure, and the voltage can be applied individually to each of the piezoelectric elements in each piezoelectric layer unit, it becomes possible to perform the tracking adjustment with a high precision and at a high speed, and to adjust properly the float height of the magnetic head.

What is claimed is:
1. A hard disk drive comprising:
  a flexure for attachment to an arm member of a suspension, the flexure for holding a head slider including a thin-film magnetic head that performs at least one of a recording and a reproduction of information with respect to a recording medium, the flexure comprising:

a main body on which the head slider is mounted, a wire for energizing the head slider being disposed on the main body; and a first piezoelectric layer unit including a first and a second layered piezoelectric element, the first piezoelectric layer unit being disposed only at an end of the main body to which the head slider is mounted, the first piezoelectric layer unit being disposed on one side of a line that extends from the head slider to a base portion of the arm member;

a second piezoelectric layer unit including a third and a fourth layered piezoelectric element, the second piezoelectric layer unit being disposed only at the end of the main body to which the head slider is mounted, the second piezoelectric layer unit being disposed on an opposite side of the line and spaced apart from the first piezoelectric layer unit; and a first external power supply electrically connected to the first layered piezoelectric element of the first piezoelectric layer unit, a second external power supply electrically connected to the second layered piezoelectric element of the first piezoelectric layer unit, a third external power supply electrically connected to the third layered piezoelectric element of the second piezoelectric layer unit, and a fourth external power supply electrically connected to the fourth layered piezoelectric element of the second piezoelectric layer unit, wherein the flexure is oriented so that each of a pair of lines crosses the recording medium, each of the pair of lines extending along a respective laminating direction of a respective one of the first and second piezoelectric layer units, and each of the first external power supply, the second external power supply, the third external power supply and the fourth external power supply supply voltages to the respective electrically connected layered piezoelectric elements, a magnitude of the voltage supplied by each external power supply being different from magnitudes of the voltages supplied by each of the other external power supplies, the supplied voltages causing the respective electrically connected layered piezoelectric elements to expand in a direction parallel to a surface of the main body.

2. The hard disk drive according to claim 1, wherein the first and second piezoelectric layer units are disposed so that the first and second piezoelectric layer units are substantially symmetrical with respect to the line that extends from the head slider to the base portion of the arm member.

3. A hard disk drive comprising:

a suspension for suspending a head slider including a thin-film magnetic head that performs at least one of a recording and a reproduction of information with respect to a recording medium, the suspension comprising:

a flexure on which the head slider is mounted, the flexure including a main body on which a wire for energizing the head slider is disposed;

an arm member to which the flexure is attached;

a first piezoelectric layer unit including a first and a second layered piezoelectric element, the first piezoelectric layer unit being disposed only at an end of the main body to which the head slider is mounted, the first piezoelectric layer unit being disposed on one side of a line that extends from the head slider to a base portion of the arm member; and a second piezoelectric layer unit including a third and a fourth layered piezoelectric element, the second piezoelectric layer unit being disposed only at the end of the main body to which the head slider is mounted, the second piezoelectric layer unit being disposed on an opposite side of the line and spaced apart from the first piezoelectric layer unit; and a first external power supply electrically connected to the first layered piezoelectric element of the first piezoelectric layer unit, a second external power supply electrically connected to the second layered piezoelectric element of the first piezoelectric layer unit, a third external power supply electrically connected to the third layered piezoelectric element of the second piezoelectric layer unit, and a fourth external power supply electrically connected to the fourth layered piezoelectric element of the second piezoelectric layer unit, wherein the flexure is oriented so that each of a pair of lines crosses the recording medium, each of the pair of lines extending along a respective laminating direction of a respective one of the first and second piezoelectric layer units, and each of the first external power supply, the second external power supply, the third external power supply and the fourth external power supply supply voltages to the respective electrically connected layered piezoelectric elements, a magnitude of the voltage supplied by each external power supply being different from magnitudes of the voltages supplied by each of the other external power supplies, the supplied voltages causing the respective electrically connected layered piezoelectric elements to expand in a direction parallel to a surface of the main body.

4. A hard disk drive comprising:

a head gimbal assembly, comprising:

a head slider that includes a thin-film magnetic head that performs at least one of a recording and a reproduction of information with respect to a recording medium;

a flexure on which the thin-film magnetic head is mounted, the flexure including a main body on which a wire for energizing the head slider is disposed;

an arm member to which the flexure is attached;

a first piezoelectric layer unit including a first and a second layered piezoelectric element, the first piezoelectric layer unit being disposed only at an end of the main body to which the head slider is mounted, the first piezoelectric layer unit being disposed on one side of a line that extends from the head slider to a base portion of the arm member; and a second piezoelectric layer unit including a third and a fourth layered piezoelectric element, the second piezoelectric layer unit being disposed only at the end of the main body to which the head slider is mounted, the second piezoelectric layer unit being disposed on an opposite side of the line and spaced apart from the first piezoelectric layer unit; and a first external power supply electrically connected to the first layered piezoelectric element of the first piezoelectric layer unit, a second external power supply electrically connected to the second layered piezoelectric element of the first piezoelectric layer unit, a third external power supply electrically connected to the third layered piezoelectric element of the second piezoelectric layer unit, and a fourth external power supply electrically connected to the fourth layered piezoelectric element of the second piezoelectric layer unit, wherein the flexure is oriented so that each of a pair of lines crosses the recording medium, each of the pair of lines extending along a respective laminating direction of a respective one of the first and second piezoelectric layer units, and each of the first external power supply, the second external power supply, the third external power supply and the fourth external power supply supply voltages to the respective electrically connected layered piezoelectric elements, a magnitude of the voltage supplied by each external power supply being different from magnitudes of the voltages supplied by each of the other external power supplies, the supplied voltages causing the respective electrically connected layered piezoelectric elements to expand in a direction parallel to a surface of the main body.

5. The hard disk drive according to claim 4, wherein the head slider is attached to the main body at a center of gravity of a side face of the head slider, the side face facing the main body.

* * * * *